United States Patent [19]
Hayashi et al.

[11] 3,927,144
[45] Dec. 16, 1975

[54] ELASTOMER COMPOSITION

[75] Inventors: Noriyuki Hayashi; Kenji Sasaki, both of Kodaira; Hideaki Inaba; Koushi Nonaka, both of Higashimurayama, all of Japan

[73] Assignee: Bridgestone Tire Company Limited, Tokyo, Japan

[22] Filed: Mar. 1, 1973

[21] Appl. No.: 337,929

Related U.S. Application Data

[63] Continuation of Ser. No. 117,824, Feb. 22, 1971, abandoned.

[30] Foreign Application Priority Data

Feb. 20, 1970 Japan................................ 45-14179

[52] U.S. Cl. .................. 260/888; 156/128; 260/82; 260/889; 260/892; 260/894
[51] Int. Cl.² ................... C08F 240/00; C08L 9/06; C08L 23/20
[58] Field of Search ............. 260/888, 889, 894, 82

[56] References Cited
UNITED STATES PATENTS

| | | |
|---|---|---|
| 2,625,523 | 1/1953 | Garber et al...................... 260/23.7 |
| 3,331,793 | 7/1967 | Souffie et al........................... 260/4 |
| 3,443,619 | 5/1969 | Kindle................................. 152/330 |
| 3,607,829 | 9/1971 | Harris ................................ 260/894 |
| 3,784,530 | 1/1974 | Osborn et al. ...................... 260/888 |

*Primary Examiner*—Murray Tillman
*Assistant Examiner*—J. Ziegler
*Attorney, Agent, or Firm*—Waters, Schwartz & Nissen

[57] ABSTRACT

Elastomer compositions having improved cut resistance useful for preparing the tread of tires particularly for large motortrucks or for off-road running, which compositions can be produced by compounding a particular petroleum resin in the amount of 5–40 weight parts, and more preferably 5–20 weight parts with 100 weight parts of styrene-butadiene elastomeric copolymer. The petroleum resin is a polymer of cyclopentadiene and/or dicyclopentadiene or copolymer thereof with an olefinic hydrocarbon copolymerizable therewith, and has a softening point of 50°–200°C and more preferably 80°–150°C and a bromine value of 40–150 and more preferably 50–150.

7 Claims, No Drawings

ELASTOMER COMPOSITION

This application is a continuation application of Ser. No. 117,824, filed Feb. 22, 1971, now abandoned.

This invention relates to an elastomer composition of styrene-butadiene copolymer compounded with an additive, and more particularly to such elastomer composition to be preferably used for tire treads of considerably improved cut-resistant properties by compounding a petroleum resin substantially of cyclopentadiene or dicyclopentadiene polymers and copolymers with styrene-butadiene synthetic rubber.

When cars are driven on unpaved roads, above all on rockribbed roads, the tread portion of the tire is often damaged due to sharp edges of rock, pebbles or the like, which phenomenon is generally called "cut" or "cutting." It has been an important problem to be solved for tire makers to find new and improved materials for the tread of the large tires for high-load motortrucks, motorbuses or of those for off-road for instance in stone pits so as to avoid suffering the cut or cutting which often develops to cause failure of the tire.

The effective development of such new materials or compositions has encountered difficulties because the correlation between the cut-resistance and vulcanized rubber physical properties, has not been made clear. The inventors have carefully investigated the cut phenomena to find out that a sharply edged rock, pebble or the like pressed under the tread of a tire running at a relatively high speed and with high load cuts momentarily into the tread portion to injure the same. Thus, we, the inventors have tried to improve the cut-resistance of the tire tread by means of improving the high-speed destructive property of the material for the tread which might be observed by reproducing in the laboratory the tread cut phenomenon in high-speed destructive tests. The high speed test referred to herein is of the order of 5 m/sec (18 km/hr), which corresponds to 600 times the speed (500 mm/min) for usual rubber tensile tests as prescribed in Japanese Industrial Standard K-6301. It is well known that there is no corelation between such two speeds with respect to the destructive property (e.g., vid. "Kautschuk and Gummi," Vol. 13, T 25, 1960, by G. Fromandi, R. Ecker and W. Heidemann). As high-speed destructive tests for reproducing cut phenomenon, impact break down tests wherein a metal blade is hit into vulcanized rubber at a high speed have been adopted taking into consideration our findings from observations of the cut phenomenon in addition to usual high-speed tensile destructive tests. Having tried various combinations of the materials to find satisfactory ones showing a desirable high-speed destructive property in the laboratory, we have applied the effective combinations to actual running tests on a rough road to develop tire tread compositions having the desirable cut-resistance.

As for the material for the tire tread, various considerations have been taken on an elastomer such as natural rubber and styrene-butadiene rubber which shall be abridged "SEE" hereinafter and on carbon-black. It has been well known that filling carbon black in high amounts into the rubber element may enhance the cut-resistance on one hand but may deteriorate the tread of such combination in other properties required particularly on a rough road such as anti-chipping, elasticity, exothermicity and workability on the other hand. With this in mind, carbon black has been added in the amount of 40–50 parts by weight per 100 parts rubber by weight in case of natural rubber and 50–60 parts in case of SBR.

However, since such compositions are not too unsatisfactory to solve the cut-resistance problem, the inventors have carried out many experiments to find out that some petroleum resins substantially of cyclopentadiene or dicyclopentadiene polymers are preferably used in lieu of conventional carbon black for improving the high-speed destructive property and consequently the cut resistance of the tire tread.

According to the invention, a synthetic resin whose softening point ranges from 50° – 200°C and bromine value ranges from 40 – 150, of cyclopentadiene and/or dicyclopentadiene or a copolymer resin of such cyclopentadiene and/or dicyclopentadiene with olefin hydrocarbons having 4 to 12 carbon atoms and copolymerizable therewith is combined in the amount of 5 – 40 weight parts with 100 weight parts SBR to produce the new composition of the invention having improved cut-resistance.

It was unexpectedly wonderful that such additive is excellent also as a softening agent or softener. Heretofore various softeners have been used for improving workability of the elastomer compositions but addition thereof often deteriorates the necessary physical properties of the vulcanized rubber not only because the softener itself has no elasticity but also there is no reaction thereof with the rubber component. The petroleum resin according to the invention, however, can contribute not only to workability of the rubber as a softener when not yet vulcanized but also to improve elastomer properties possibly owing to its chemical reaction or physical mutual action with the rubber component. In contrast to the conventional processing oils, the petroleum resin substantially of cyclopentadiene of dicyclopentadiene according to this invention can considerably improve high-speed tensile strength and impact destructive property of the elastomer composition without deteriorating the workability and exothermicity. This effect could not be expected from the usual softener or processing oil.

This is possibly from the secondary weak bond of the petroleum resin in the new elastomer composition whose Shore-hardness and low tensile stress resistance are higher than the conventional elastomer composition combined with the usual processing oil in which there is recognized the primary bond of rubber-rubber and rubber-carbon black. Such a weak bond would be broken when the stress is increased at the tensile tests of normal speed say, 500 mm/min but would act sufficiently against momentary deformation namely at the time of high speed tensile or impact so as to elevate the high-speed destructive property of the tire tread made from these compositions and prevent the sharp edge of the metal blade or rock from eating into the same.

The petroleum resin substantially of cyclopentadiene and/or dicyclopentadiene means a polymer of cyclopentadiene and/or dicyclopentadiene or a copolymer of cyclopentadiene and/or dicyclopentadiene with any of olefin hydrocarbons copolymerizable therewith in which the content of cyclopentadiene and/or dicyclopentadiene comprises more than 30 weight %, and preferably more than 50 weight %.

Among the olefin hydrocarbons are included monoolefinic aliphatic hydrocarbons such as 1-butene, 2-butene, isobutene, 1-pentene, 2-pentene, 2-methyl-1-butene, 3-methyl-1-butene, 2-methyl-2-butene; diolefinic aliphatic hydrocarbons such as butadiene, isoprene, 2-methyl-1, 3-butadiene, 1, 3-pentadiene, 3-methyl-1, 2-butadiene; and vinyl substituted aromatic hydrocarbons such as styrene, p-vinyltoluene, m-vinyltoluene, o-vinyltoluene, -2 methylstyrene, β-methylstyrene, m-ethylstyrene, p-ethylstyrene, indene, 3-methylindene, 1-vinylnaphthalene, 2-vinylnaphthalene, all of which may be copolymerized with cyclopentadiene or dicyclopentadiene by means of Friedel-Crafts reaction etc. in the presence of a suitable catalyst. It will be noted that these olefinic hydrocarbons have 4 to 12 carbon atoms.

These petroleum resins for this invention, however, must have a softening point (according to the ring and ball test method, JIS K-5902) of 50° - 200°C and more preferably 80° - 150°C and a bromine value (ASTM D-1158-57T) of 40 - 150 and more preferably 50 - 150 in view of the molecular weight and reactivity of the double bond in order to obtain the desired effects in the physical properties of vulcanized rubber.

As elastomer element to be used for the composition of the invention, natural rubber, polybutadiene rubber, SBR and the like may be taken into consideration, but the combination with SBR shows very excellent effect on the high-speed destructive property, from which fact also it is guessed that there may be π-electron mutual action between the cyclopentadiene ring and styrene in addition to reaction of sulfur with the petroleum resin when vulcanized. The petroleum resin according to the invention has a peculiar behavior in relation to SBR.

The petroleum resin should be combined in the amount of 5 - 40 parts by weight, and more preferably 5 - 20 parts by weight per 100 parts by weight of SBR from the point of view of workability of the unvulcanized material and the desirable property for the tire tread.

The present invention has been and shall be illustrated as a material for the tire tread, but this new elastomer combination can be used of course for other articles where cut-resistance is desirable.

EXAMPLE 1

The experimental data of the elastomer compositions of cyclopentadienic petroleum resin and SBR are shown in Table 1 in comparison with those combined with aromatic processing oil and coumarone-indene resin as the softener usually used for SBR. As for wax, antioxidant and vulcanization accelerators, the conventional ones for tire treads were added. The ratios are shown all in weight parts.

The compounding was done by means of the usual method using a No. 11 Banbury mixer. The determinations of physical properties were made regarding hardness, tensile test at 500 mm/min and tear resistance according to JIS K-6301. The high-speed tensile tests at 5 m/sec were made on DIN No. 3 samples taken from 2 mm thickness of the vulcanized material sheet using a plastecon type high-speed tensile tester. Impact cut tests were carried out by hitting a steel blade of the pendulum type impact cut tester to provide the results in depths of cut.

The appearance of the tread is shown in results of actual 2,200 km running including sudden brakings on the rockribbed road in the stone pit of tires having the sample treads prepared in dimension of 1,000 - 20 for motor trucks each tire having a tread consisting of four parts respectively made of four different tread materials, namely two tires having four parts of tread made of X–A–B–D and the other two tires of X–C–D–E.

Table 1

|  | X | A | B | C | D | E |
|---|---|---|---|---|---|---|
| SBR-1500 | 100 | 100 | 100 | 100 | 100 | 15 |
| Natural Rubber | — | — | — | — | — | 85 |
| Stearic Acid | 2 | 2 | 2 | 2 | 2 | 3 |
| HAF Carbon Black | 60 | 60 | 60 | 60 | 60 | 45 |
| Esso Process Oil H-2 | 20 | — | 10 | — | — | 10 |
| Coumarone BM* | — | 20 | — | — | — | — |
| Cyclopentaciene Resin A** | — | — | 10 | 20 | — | — |
| Cyclopentadiene Resin B*** | — | — | — | — | 20 | — |
| Wax & Antioxidant | 3 | 3 | 3 | 3 | 3 | 3 |
| ZnO | 3 | 3 | 3 | 3 | 3 | 3 |
| Vulcanization-accelerator | 1.6 | 1.6 | 1.6 | 1.6 | 1.6 | 1.6 |
| Sulfur | 2 | 2 | 2 | 2 | 2 | 2.5 |
| Hardness (JIS Hardness) | 60 | 63 | 64 | 67 | 68 | 57 |
| Tensile Speed 500 mm/min |  |  |  |  |  |  |
| Elongation (%) | 530 | 590 | 580 | 630 | 600 | 520 |
| Tensile Strength (Kg/cm$^2$) | 205 | 242 | 212 | 215 | 202 | 267 |
| 100% Modulus (Kg/cm$^2$) | 18.4 | 19.7 | 20.3 | 21.4 | 21.5 | 17.2 |
| 300% Modulus (Kg/cm$^2$) | 87 | 103 | 91 | 92 | 88 | 83 |
| Tear Resistance (Kg/cm) | 54 | 61 | 58 | 62 | 61 | 85 |
| Tensile Speed 5 m/sec |  |  |  |  |  |  |
| Elongation (%) | 705 | 745 | 680 | 680 | 675 | 690 |
| Tensile Strength (Kg/cm$^2$) | 170 | 181 | 188 | 195 | 193 | 161 |
| 300 Modulus (Kg/cm$^2$) | 100 | 119 | 121 | 134 | 129 | 85 |
| Impact Cut Test (mm) | 30.4 | 26.2 | 14.7 | 0.6 | 1.3 | 28.1 |
| Tread Appearance**** |  |  |  |  |  |  |
| Large cut | 3.5 | 3.3 | 1.9 | 0.6 | 0.5 | 3.3 |
| Small Cut | 14.4 | 9.6 | 6.4 | 3.4 | 4.6 | 11.2 |
| Chipping | 4.2 | 3.3 | 2.8 | 0.8 | 1.0 | 6.1 |

* Coumarone manufactured by Ohuchi Shinko Kabushiki Kaisha and having a softening point of 72°C and bromine value of 21.
** Copolymer resin of about 50% cyclopentadiene, about 40% aromatic hydrocarbon and about 10% other olefin, having a softening point of 105°C and a bromine value of 99.
*** Copolymer resin of about 70% cyclopentadiene, and about 30% other olefins, having softening point of 102°C and bromine value of 107.
**** The numbers of cuts and chippings per 100 cm$^2$ of the tire surface after the running. large cut meaning such a cut having depth of more than 5 mm, small cut having a depth of 1 mm to 5 mm, chipping representing a phenomenon of a tread piece larger than 25 mm$^2$ having been chipped off.

As appreciated from the above, the cyclopentadiene resin improves the cut resistance to a great extent in comparison with the usual processing oil and coumarone resin. It is also clear that the elastomer composition of SBR with cyclopentadienic petroleum resin according to the invention is far superior in cut resistance to the usual natural rubber composition (E) compounded with the same resin.

EXAMPLE 2

The compounding and tests were similarly made as in Example 1 but the tread appearance is given as results of the running test with respect to one tire having a tread of X–F–G–H and another having a tread of X–I–J–K.

Table 2

|  | X | F | G | H | I | J | K |
|---|---|---|---|---|---|---|---|
| SBR-1500 | 100 | 100 | 100 | 100 | 100 | 100 | 100 |
| Stearic Acid | 2 | 2 | 2 | 2 | 2 | 2 | 2 |
| HAF Carbon Black | 60 | 60 | 60 | 60 | 60 | 60 | 60 |
| Esso Processing Oil H-2 | 20 | — | — | — | — | — | — |
| Cyclopentadiene Resin C* | — | 20 | — | — | — | — | — |
| Cyclopentadiene Resin D** | — | — | 20 | — | — | — | — |
| Cyclopentadiene Resin E*** | — | — | — | 20 | — | — | — |
| Cyclopentadiene Resin F**** | — | — | — | — | 20 | — | — |
| Cyclopentadiene Resin G***** | — | — | — | — | — | 20 | — |
| Cyclopentadiene Resin H****** | — | — | — | — | — | — | 20 |
| Wax & Antioxidant | 3 | 3 | 3 | 3 | 3 | 3 | 3 |
| ZnO | 3 | 3 | 3 | 3 | 3 | 3 | 3 |
| Vulcanization-Accelerator | 1.6 | 1.6 | 1.6 | 1.6 | 1.6 | 1.6 | 1.6 |
| Sulfur | 2 | 2 | 2 | 2 | 2 | 2 | 2 |
| Tensile Speed 5 m/sec |  |  |  |  |  |  |  |
| Elongation (%) | 670 | 690 | 690 | 660 | 680 | 710 | 630 |
| Tensile Strength (Kg/cm$^2$) | 172 | 194 | 196 | 195 | 203 | 168 | 180 |
| 300% Modulus (Kg/cm$^2$) | 95 | 108 | 110 | 121 | 123 | 91 | 99 |
| Impact Cut Test (mm) | 21.5 | 2.6 | 3.2 | 1.1 | 0.7 | 18.4 | 15.1 |
| Tread Appearence |  |  |  |  |  |  |  |
| Large Cut | 4.9 | 1.1 | 1.1 | 0.6 | 0.7 | 4.0 | 4.1 |
| Small Cut | 18.2 | 5.2 | 6.1 | 4.9 | 3.4 | 15.4 | 13.9 |
| Chipping | 3.1 | 0.4 | 0.3 | 0.4 | 0.5 | 2.4 | 3.5 |

C*Cyclopentadiene resin having a softening point of 148°C and a bromine value of 131.
D**Copolymer resin of about 50% cyclopentadiene, about 10% aromatic olefins and about 40% other olefins, having a softening point of 72°C and a bromine value of 115.
E***Copolymer resin of about 35% cyclopentadiene, about 55% aromatic olefins and about 10% other olefins, having a softening point of 109°C and a bromine value of 59.
F****Copolymer resin of about 85% cyclopentadiene and about 10% aromatic olefins, having a softening point of 145°C and a bromine value of 122.
G*****Copolymer resin of about 15% cyclopentadiene, about 25% aromatic olefins and about 60% other olefins, having a softening point of 42°C and a bromine value of 97.
H******Copolymer resin of about 10% cyclopentadiene and about 90% aromatic olefins, having a softening point of 151°C and a bromine value of 31.

From said Table 2, it should be appreciated that the cyclopentadienic petroleum resins improved the cut resistance of the compositions compounded with SBR but as seen in J and K when the amount of such resin is too small or when the resins are of lower bromine value or lower softening point the effect is worse than that of the compositions according to the invention, although such cyclopentadienic petroleum resins can still attain more desirable results than when the conventional additives are used.

What is claimed is:

1. A vulcanized composition in the form of a tire tread comprising (A) 100 parts by weight of a styrene-butadiene elastomeric copolymer and (B) 5 to 40 parts by weight of a petroleum resin which is a copolymer of (1) a cyclic diene monomer selected from the group consisting of cyclopentadiene, dicyclopentadiene and mixtures thereof, (2) a copolymerizable vinyl substituted aromatic hydrocarbon monomer having up to 12 carbon atoms and optionally (3) another copolymerizable olefinic monomer having 4–12 carbon atoms and selected from the group consisting of mono-and di-olefinic aliphatic hydrocarbons, said cyclic diene monomer content of said petroleum resin copolymer being at least 30 weight % and said petroleum resin copolymer having a softening resin of 50 to 200°C. and a bromine value of 40 to 150.

2. A vulcanized composition as claimed in claim 1, wherein said copolymerization vinyl substituted aromatic hydrocarbon monomer is selected from the group consisting of styrene, p-vinyltoluene, m-vinyltoluene, o-vinyltoluene, α-methylstyrene, β-methylstyrene, m-ethylstyrene, p-ethylstyrene, indene, 3-methylindene, 1-vinylnaphthalene and 2-vinylnaphthalene.

3. A vulcanized composition as claimed in claim 1, wherein said copolymerizable vinyl substituted aromatic hydrocarbon is selected from the group consisting of styrene, p-vinyltoluene, m-vinyltoluene, o-vinyltoluene, α-methylstyrene, β-methylstyrene, m-ethylstyrene, p-ethylstyrene, indene, 3-methylindene, 1-vinylnaphthalene and 2-vinylnaphthalene, and said copolymerization mono-olefinic aliphatic hydrocarbon is selected from the group consisting of 1-butene, 2-butene, isobutene, 1-pentene, 2-pentene, 2-methyl-1-butene, 3-methyl-1-butene and 2-methyl-2-butene and said copolymerizable di-olefinic aliphatic hydrocarbon is selected from the group consisting of butadiene, isoprene, 2-methyl-1-3-butadiene 1,3-pentadiene and 3-methyl-1, 2-butadiene.

4. A composition as claimed in claim 1, wherein the amount of said petroleum resin is 5 to 20 parts by weight.

5. A composition according to claim 1 wherein the petroleum resin copolymer comprises about 50% cyclopentadiene, about 40% of vinyl substituted aromatic hydrocarbon hydrocarbon and about 10% of another olefin, said resin having a softening point of 105°C. and a bromine value of 99.

6. The vulcanized composition of claim 1 comprising carbon black.

7. The vulcanized composition of claim 6 in comprising 60 parts by weight of carbon black per 100 parts by weight of the styrene-butadiene copolymer.

* * * * *